United States Patent
George et al.

(10) Patent No.: US 6,502,218 B1
(45) Date of Patent: Dec. 31, 2002

(54) DEFERRED CORRECTION OF A SINGLE BIT STORAGE ERROR IN A CACHE TAG ARRAY

(75) Inventors: Varghese George, Folsom, CA (US); Michael Robert Mroczek, Granite Bay, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/461,243

(22) Filed: Dec. 16, 1999

(51) Int. Cl.[7] ................................................ G11C 29/00
(52) U.S. Cl. ...................................... 714/805; 714/799
(58) Field of Search ............................. 714/52, 768, 6, 714/748, 764, 805, 799; 711/118, 126; 704/231

(56) References Cited

U.S. PATENT DOCUMENTS

| | | | | |
|---|---|---|---|---|
| 4,388,684 A | * | 6/1983 | Nibby, Jr. et al. | 714/52 |
| 5,500,950 A | * | 3/1996 | Becker et al. | 711/118 |
| 5,701,503 A | * | 12/1997 | Singh et al. | 711/126 |
| 6,038,693 A | * | 3/2000 | Zhang | 714/768 |
| 6,157,910 A | * | 12/2000 | Ortega | 704/231 |
| 6,292,906 B1 | * | 9/2001 | Fu et al. | 714/6 |

* cited by examiner

*Primary Examiner*—David Ton
(74) *Attorney, Agent, or Firm*—Kenyon & Kenyon

(57) ABSTRACT

Methods and apparatus defer correction of an error in a tag entry of a cache tag array. An address of requested data, including an address tag field, can be received by a cache. A first hit indication based at least in part on a comparison of the address tag field and a first tag entry can be generated and result in outputting of a first data entry of a data array. An error in the tag entry can be detected, and the first data entry can be disregard based at least in part on the detected error.

22 Claims, 4 Drawing Sheets

*PRIOR ART*

DEFERRED CORRECTION OF A SINGLE BIT STORAGE ERROR IN A CACHE TAG ARRAY

FIELD OF THE INVENTION

Embodiments of the present invention relate to reading data from a cache. More particularly, embodiments of the present invention relate to a deferring correction of a single bit storage error in a cache tag array.

BACKGROUND OF THE INVENTION

Central processing units (CUPS) can now operate significantly faster than main memory. To address the increased disparity in operation speeds between CUPS and main memory, CUPS typically include larger cache memory (e.g., a larger level 1 (L1) cache, a larger level 2 (L2) cache, etc.) to increase system performance. Cache memory temporarily stores data (e.g., code; system data, etc.) that is requested from, and written to, main memory by the CPU. When a CPU requests a specific block of data identified by an address (e.g., a code address, a data address), that address can be passed to a cache to determine whether the requested block of data is stored within the cache memory. Cache memory typically operates at a speed that is significantly faster than the main memory and closer to the speed of the processor. In addition to storing blocks of data, a cache includes a tag array. Each tag in the tag array corresponds to an address of a block of data stored in the cache. After the cache receives an address of a requested block of data, the cache can determine whether the address corresponds to a tag stored in the tag array and consequently whether the requested block of data is stored in the cache.

Larger CPU cache sizes can result in a larger tag array, and a larger tag array can have a higher probability of incurring a soft error. A soft error can be caused by background cosmic radiation (e.g., alpha particles) that impacts the tag array and causes a bit to logically flip. The increased incidence of soft errors in tag arrays also can be related to the use of lower voltage integrated circuit technologies (e.g., changes from 5 volts, to 3.3 volts, to 2 volts, to 1 volt, etc.). Soft errors may result in lower levels of correctness in a cache and disadvantageously effect the robustness of cache performance.

In a known cache design, detection and correction of errors in the stored data increases cache read latency. An example of a known methodology of detection and correction of stored data errors is Error Checking and Correction (ECC), by which errors at the bit level or multiple-bit level in memory can be intercepted and corrected as data is being sent to a CPU. Under the ECC methodology, for each data word there is a set of extra bits (i.e., an ECC code) that is used to store an encrypted version of the data word. Each data word includes a corresponding ECC code. The number of extra bits that comprise the ECC code depends on the length of the binary word of data. For a 32-bit data word, an ECC code includes seven bit. A 64-bit data word requires an additional 8 bits for the ECC code.

FIG. 1 shows a known cache system design. Cache 100 includes a tag array 101 and a data array 102. Tag array 101 includes a plurality of tag entries 111, and data array 102 includes a plurality of data entries 112. Each tag entry of the plurality of tag entries 111 corresponds to a data entry of the plurality of data entries 112.

Cache controller 110 is coupled to cache 100 and can send an address of requested data to the cache 100. As used to describe embodiments of the present invention, coupled means connected directly or indirectly. A comparator 105 of cache 100 compares a portion of the address of requested data (e.g., an address tag field of the address of requested data) to a tag entry of tag array 101 after the tag entry is processed by ECC detection logic 103 and ECC correction logic 104.

For example, the tag entry can include an ECC code. The tag entry and its corresponding ECC code can be compared by the ECC detection logic 103 when the tag entry is read from the tag array 101. When the code and the data word do not match, then the data word can be corrected using the ECC code by the ECC correction logic 104.

Detecting and correcting errors in the tag array using known methods (e.g. ECC) may disadvantageously increase cache read latency because a corrected tag entry can be required to determine whether requested data (e.g. an instruction, a data word, etc.) is present in the cache. For example, depending on the clock rates used and other design criteria of a CPU and the cache, performing ECC upon a tag entry can add an additional clock cycle of latency to a data request from the cache. When a cache access requires 5 clock cycles without performing ECC on a tag entry, then an additional clock cycle required for ECC can impose a twenty percent performance penalty upon cache access. In view of the foregoing, it can be appreciated that a substantial need exists for a method and system which can advantageously defer correction of detected errors in the tag array.

SUMMARY OF THE INVENTION

Embodiments of the present invention include methods and apparatus to defer correction of an error in a tag entry of a cache tag array. A cache can receive an address of requested data, including an address tag field. A first hit indication based at least in part on a comparison of the address tag field and a first tag entry can be generated. Based at least in part on the first hit indication, a first data entry of a data array can be output. An error in the tag entry can be detected, and the first data entry can be disregard based at least in part on the detected error.

DETAILED DESCRIPTION

Embodiments of methods and apparatus to defer correcting errors in tag entries of a tag array are described. In the following description, for purposes of explanation, numerous specific details are set forth to provide a thorough understanding of the present invention. It will be appreciated, however, by one skilled in the art that the present invention may be practiced without these specific details. In other instances, structures and devices are shown in block diagram form Furthermore, one skilled in the art can readily appreciate that the specific sequences in which methods are presented and performed are illustrative and it is contemplated that the sequences can be varied and still remain within the spirit and scope of the present invention.

Figure 1:
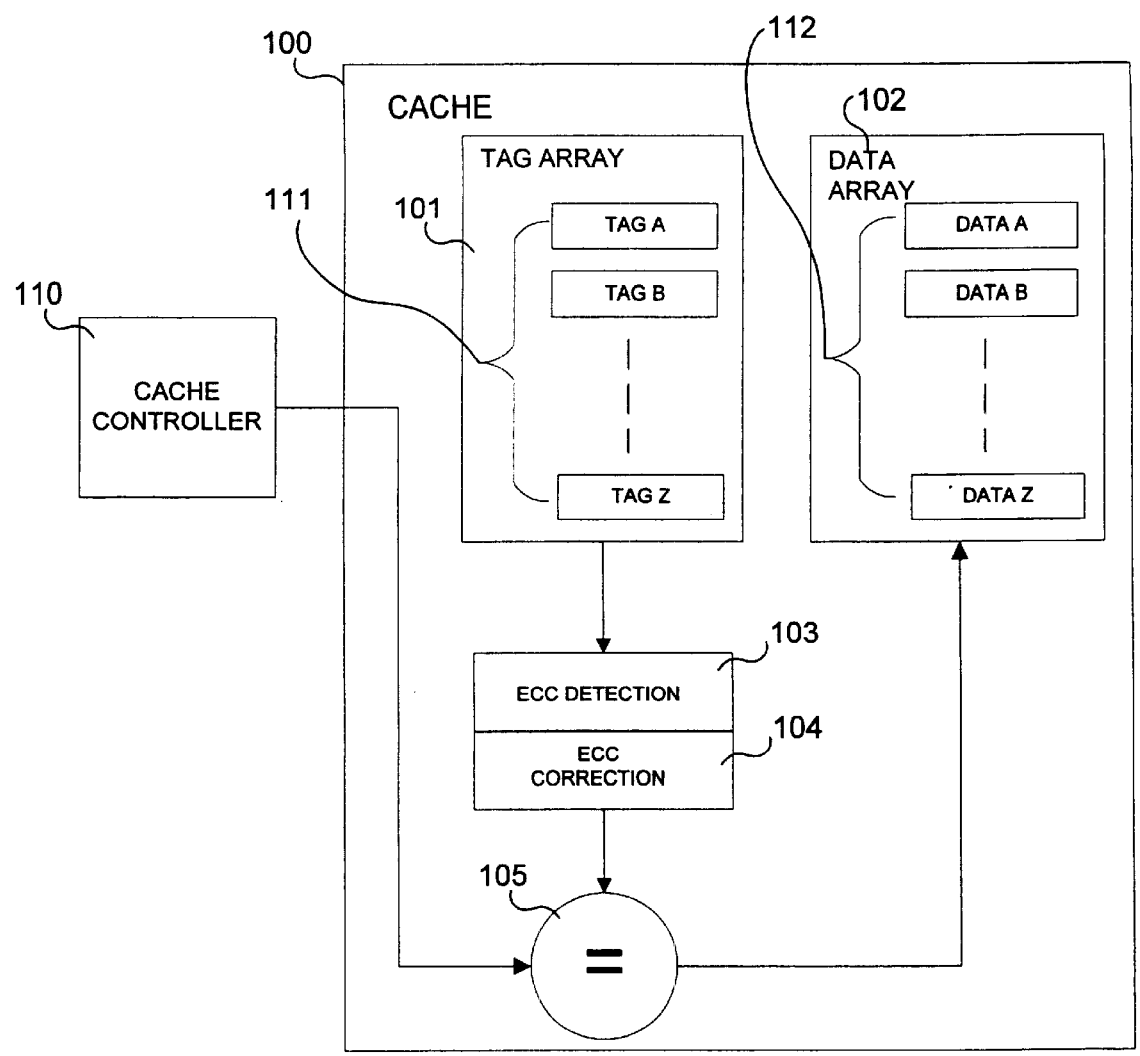
FIG. 1 shows a known system for correcting errors in the TAG array of a cache.
Figure 2:
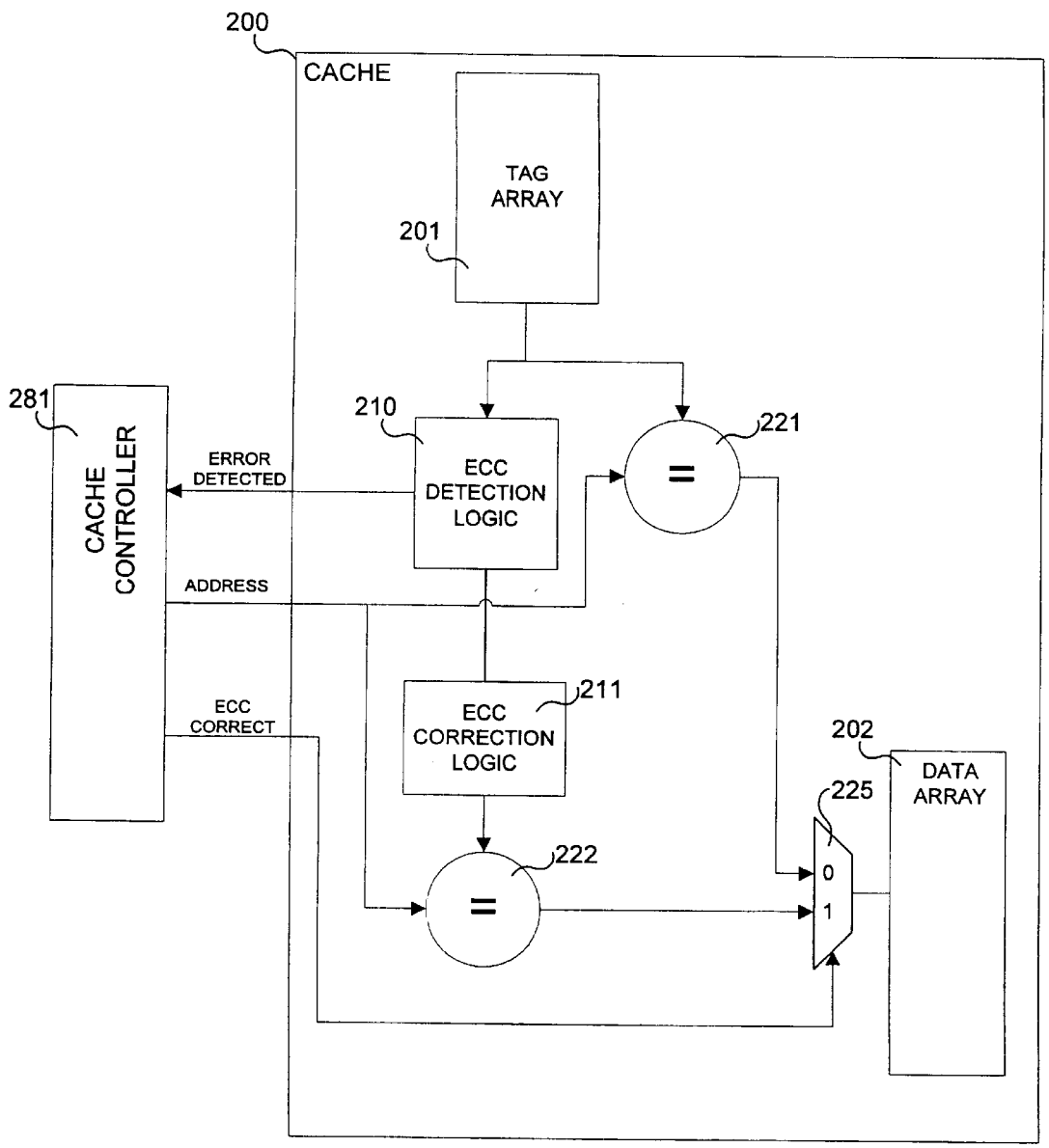
FIG. 2 shows an apparatus in accordance with an embodiment of the present invention.

FIG. 2 shows an apparatus in accordance with an embodiment of the present invention. In an embodiment of the present invention, data access from a cache can be selectively controlled such that the data access is typically based on a hit indication generated without performing ECC detection and correction upon tag entries. Performing ECC detection and correction upon tag entries can increase the latency of data access. In the event of an error in a tag entry, the data access can be based upon an ECC corrected tag entry.

In one embodiment, cache 200 includes a tag array 201 and a data array 202. A cache controller 281 is coupled to cache 200 and can send an address of requested data to the cache 200. A first comparator 221 and a second comparator 222 can each receive at least an address tag field of the address of requested data. The first comparator 221 can generate a first hit indication based on a comparison of the address tag field and a first tag entry of the tag array 201.

The first tag entry can be received by ECC detection logic 210 that can detect whether the first tag entry has a single-bit error, e.g., by comparing an ECC code portion of the first tag entry to a tag portion of the first tag entry. When a single-bit error is detected, the ECC detection logic 210 can generate a error detected signal. ECC correction logic 211 can receive the first tag entry, correct the single-bit error, and generate a corrected tag entry. The corrected tag entry can be received by the second comparator 222. The second comparator 222 can generate a second hit indication based on a comparison of the address tag field and the corrected tag entry.

Each of the first hit indication and the second hit indication can be received by a multiplexer 225. The multiplexer 225 can selectively output one of the first hit indication (generated without ECC detection and/or correction performed) and the second hit indication (generated with ECC detection and correction performed) based on the status of an ECC correct signal output by cache controller 281. In one embodiment, access of data from the data array 202 is based on the output of the multiplexer 225, e.g., either the first hit indication or the second hit indication.

The ECC correct signal can be generated by the cache controller 281 in response to the error detected signal generated by the ECC detection logic 210. In one embodiment, the error detected signal is low (e.g., a logical zero, a voltage close to zero volts, etc.) in the absence of any single-bit error in a tag entry, and goes to high (e.g., to a logical one, to a voltage of 5 volts, to a voltage of 3.3 volts, to a voltage of 2.5 volts, etc.) to indicate that a single-bit error has been detected. When the cache controller 281 receives an error detected indication, it can generate an ECC correct signal to the cache 200 indicating that data access from the cache 200 should be based on an ECC corrected tag entry. In one embodiment, when the error detected signal goes high (e.g., to indicate detection of a single-bit error in a tag entry), the ECC correct signal goes high (e.g., to indicate data access from the cache should be based on an ECC corrected tag entry).

In one embodiment, when the ECC detected signal is low and indicating no detected single-bit error in a tag entry, then the ECC correct signal is low and multiplexer 225 selects the first hit indication output by first comparator 221 to control data access from the data array 202. The first hit indication is generated without a delay caused by performing ECC detection and correction, and a first data entry of the data array 202 can be accessed based on the first hit indication. When the ECC detected signal goes high to indicate that a single-bit error in a tag entry has been detected, then the ECC correct signal goes high so that multiplexer 225 selects the second hit indication output by second comparator 222 to control data access from the data array 202. A forced miss can be generated by the cache controller 281 in response to the error detected signal indicating a single-bit error so that the first data entry previously accessed will be disregarded. After the multiplexer 225 selects the second hit indication to control data access from the data array 202, a second data entry of the data array 202 can be accessed based on the second hit indication.

Embodiments of the present invention are described with respect to detection and correction of single-bit errors in tag entries. Based upon system performance characteristics and the latency caused by correction of detected errors in tag entries, other embodiments of the present invention include methods and apparatus to defer correction of other errors (e.g., double-bit errors, etc.) in tag entries in addition to single-bit errors in tag entries.

Figure 3:
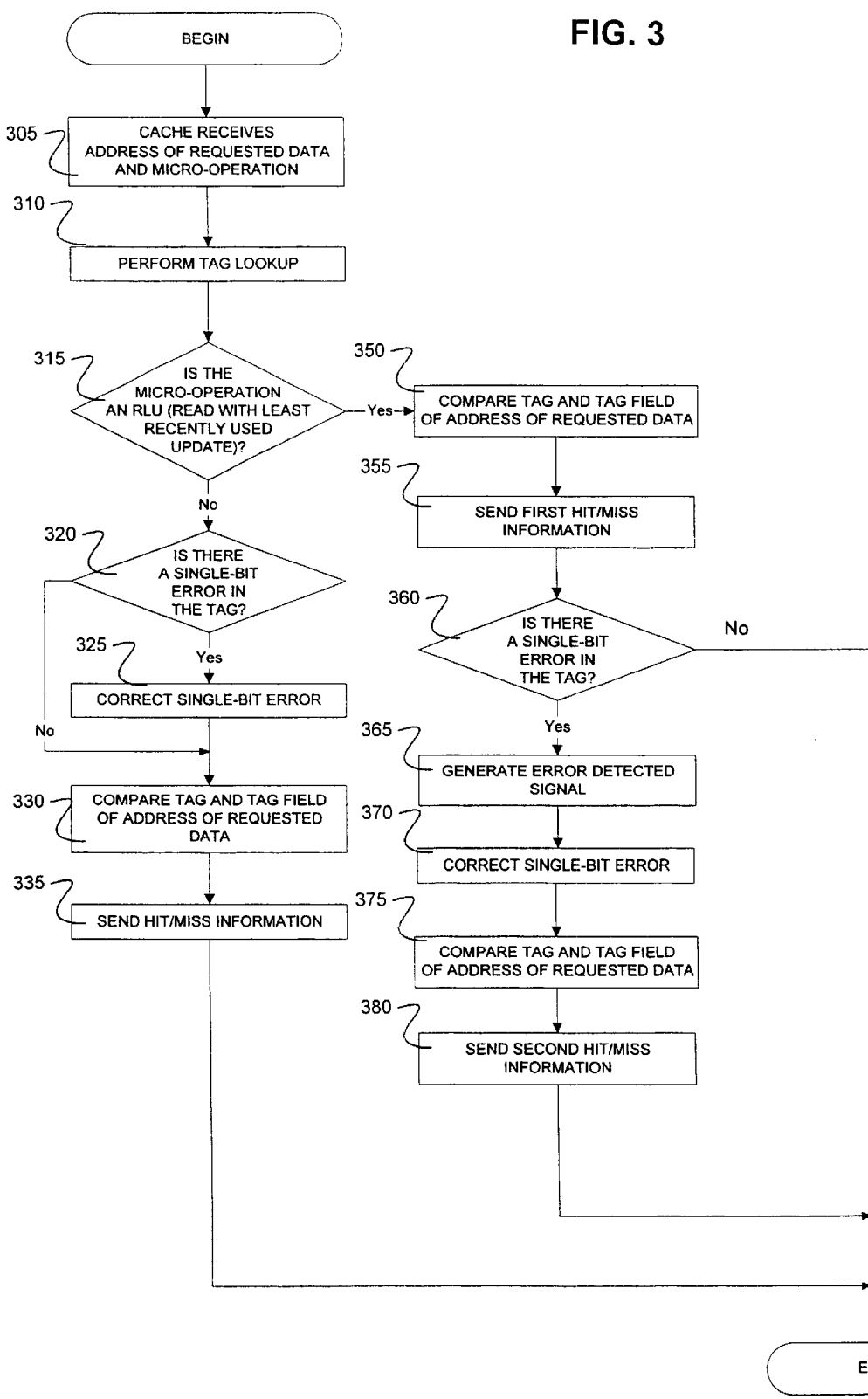
FIG. 3 shows a method in accordance with an embodiment of the present invention.

FIG. 3 shows a method in accordance with an embodiment of the present invention. A cache receives an address of requested data and a micro-operation (305). Examples of a cache micro-operation include an RLU (read with LRU (least recently used) update), TI (tag inquire), TRR (tag read, data read), TWR (tag write, data read), TWW (tag write, data write), TW (tag write), and EVICT (eviction). The cache performs a tag lookup (310). It is determined whether the micro-operation is an RLU(315).

When the micro-operation is not an RLU, then it is determined whether there is a single-bit error in the tag (320). When there is a single-bit error, then the single-bit error is corrected (325) and the tag and a tag field of the address of requested data are compared (330). When there is no single-bit error, then the tag and a tag field of the address of requested data are compared (330) without correction of any single-bit error. Based upon the tag and tag field comparison, the hit/miss information is sent from the cache (e.g., a data entry corresponding to the hit, a miss indication, etc.) (335).

When the micro-operation is an RLU, then the tag and a tag field of the address of requested data are compared (350) and a first hit/miss information is sent from the cache (e.g., a first data entry corresponding to a hit, a miss indication, etc.). Whether or not there is a single-bit error in the tag is determined (360). When there is no single-bit error, then the first hit/miss information is accurate and has been accessed without a delay caused by error detection and/or correction. When there is a single-bit error, then an error detected signal is generated (365). The error detected signal can force a miss so that any first data entry accessed when the first hit/miss information was sent from the cached (355) can be disregarded. The single-bit error in the tag can be corrected (370), and the tag and the tag field of the address of requested data are compared (375). Based upon the tag and tag field comparison, a second hit/miss information can be sent from the cache (e.g., a second data entry corresponding to the second hit, a second miss indication, etc.) (380).

Figure 4:
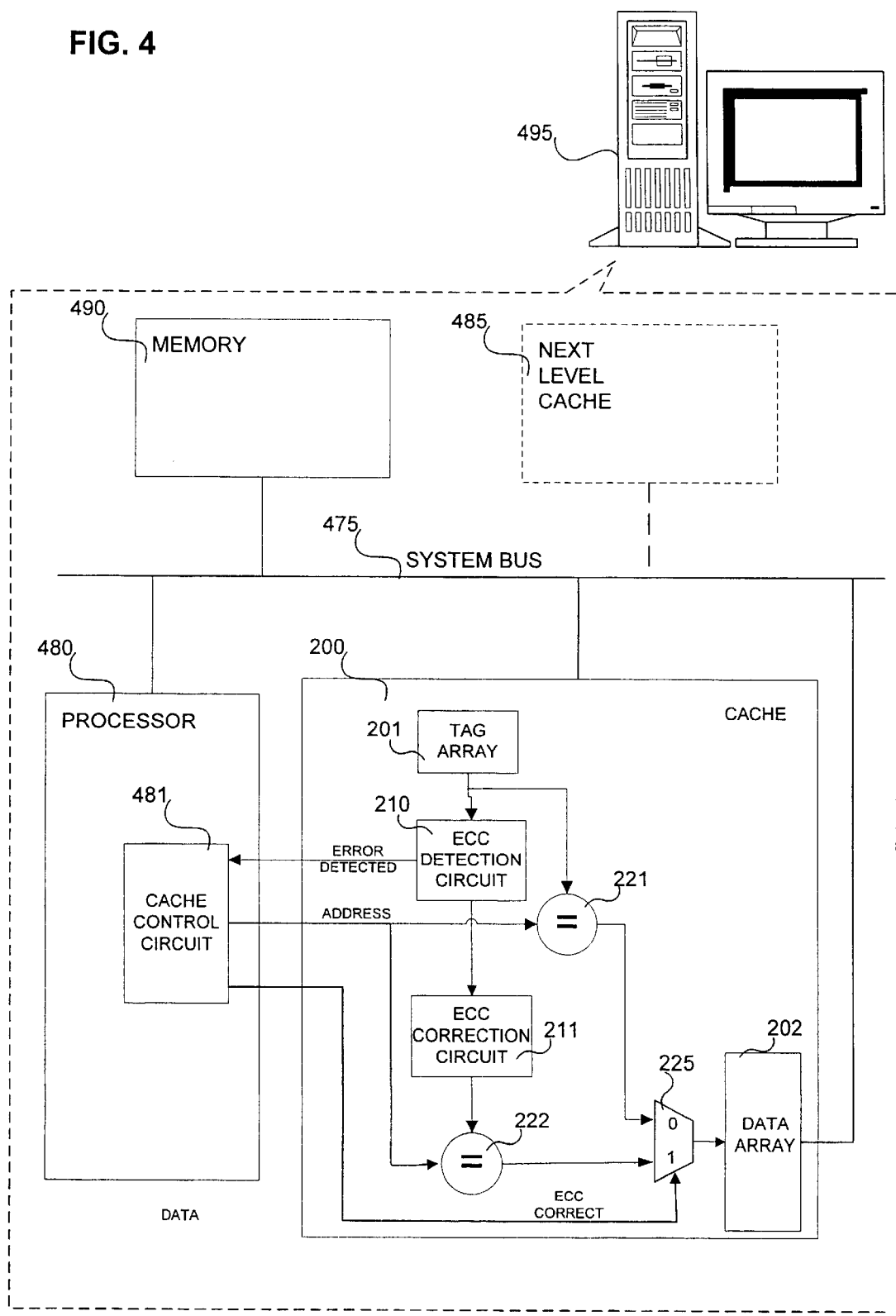
FIG. 4 shows a system in accordance with an embodiment of the present invention.

FIG. 4 shows a system in accordance with an embodiment of the present invention. Workstation 495 includes a system bus 475 coupled. to a memory 490, processor 480, and cache 200. In one embodiment, cache 200 corresponds to the cache 200 illustrated and described in FIG. 2. Cache 200 is coupled to a cache control circuit 481 of processor 480. The cache control circuit 481 can send the address of requested data to cache 200, receive an error detected signal when a single-bit error is detected in a tag entry, and generate an ECC correct signal that is received by the cache 200. In one embodiment, the ECC correct signal is based at least in part on the error detected signal, e.g., when the error detected signal is low, the ECC correct signal is low, and data is accessed from the cache 200 based on a tag comparison performed without a prior detection and correction of single-bit errors in tag entries. When the error detected signal goes high (indicating a single-bit error in a tag entry), the ECC correct signal can go high in response, and data is accessed from the cache 200 based on a tag comparison performed with detection and correction of a single-bit error in the tag entry.

In another embodiment of the present invention, the ECC correct signal is based at least in part on the cache micro-operation sent to the cache 200 from cache control circuit 481. In one embodiment, data is initially accessed from the data array 202 based on a tag comparison performed without prior detection and correction of an error in the tag entry for certain cache micro-operations that are performance critical (e.g., an RLU cache micro-operation, etc.). For other cache micro-operations (e.g., TI, TRR, TWR, TW, EVICT micro-operations, etc.) the cache control circuit can maintain the ECC correct signal at a logical value that causes data access from the cache to be based on a tag comparison performed with prior detection and correction of an error in a tag entry. Requiring data access to be based on a tag comparison performed with prior detection and correction of an error in a tag entry for certain cache micro-operations (e.g., a TI cache micro-operation) can reduce the complexity of handling errors in a tag entry during external snoops to the system.

In one embodiment, the processor 480 receives an error detected signal indicating an error in a tag entry and treats the cache micro-operation as resulting in a miss in the cache 200. The processor can then forward the cache micro-operation to a next level cache 485 or a memory 490. The processor 480 can also generate a flush cache directive, which can instruct the next level cache 485 to initiate a self-snoop into the system when the cache micro-operation appears on the system bus 475 so that any modified state data in the cache 200 (i.e., the data in the cache 200 is valid, but the memory copy of the data is out of date) is provided to the processor 480 to maintain cache coherency.

In accordance with one embodiment of the present invention, computer-readable instructions adapted to be executed by a processor to perform a method in accordance with an embodiment of the present invention are stored on a computer-readable medium and distributed as software. The computer-readable medium can a device adapted to store digital information. For example, a computer-readable medium includes a portable magnetic disk, such as a floppy disk; or a Zip® disk, manufactured by the Iomega Corporation of Roy, Utah (Zip® is a registered trademark of Iomega Corporation); or a Compact Disk Read Only Memory (CD-ROM) as is known in the art for distributing software. The computer-readable medium is distributed to a user that has a processor suitable for executing instructions adapted to be executed. The term "adapted to be executed" is meant to encompass any instructions that are ready to be executed in their present form (e.g., machine code) by a processor, or require further manipulation (e.g., compilation, decryption, or provided with an access code, etc.) to be ready to be executed by a processor.

Embodiments of the present invention can be implemented based on an understanding that single-bit tag entry errors can be rare events from a performance perspective. For certain access to the cache (e.g., those that are not performance critical), error detection and correction can be performed with the corresponding increase in latency. For accesses that are performance critical (e.g., RLUs, etc.), error detection and tag lookup/comparison can proceed in parallel and the results of the error detection are not in the critical path of the data array access. When an error is detected, the then correction can be performed using the deferred methods in accordance with embodiments of the present invention. Accordingly, embodiments of the present invention can provide reduced average latency of data access from the cache.

In the foregoing detailed description, apparatus and methods in accordance with embodiments of the present invention have been described with reference to specific exemplary embodiments. Accordingly, the present specification and FIGS. are to be regarded as illustrative rather than restrictive.

What is claimed is:

1. A method to defer correction of an error in a tag entry of a cache tag array, the method comprising:

receiving an address of requested data, the address including an address tag field;

receiving a micro-operation;

determining whether to defer the correction of the error based on the micro-operation; field and a first tag entry;

outputting a first data entry of a data array based at least in part on the first hit indication;

detecting an error in the tag entry; and disregarding the first data entry based at least in part on detecting the error in the tag entry and the micro-operation.

2. The method of claim 1, the method further comprising:

generating an error correction indication;

generating a corrected tag entry based at least in part on correcting the error in the first tag entry;

generating a second hit indication based at least in part on a second comparison of the address tag field and the corrected tag entry; and selecting the second hit indication for output to the data array based at least in part on the received error correction indication.

3. The method of claim 2, wherein generating an error correction indication is based at least in part in response to receiving the tag entry error indication.

4. The method of claim 2, further comprising outputting a second data entry of the data array based at least in part on the second hit indication.

5. The method of claim 2, wherein:

detecting an error in the tag entry is based at least in part on ECC error detection; and generating a corrected tag entry based at least in part on correcting the error in the first tag entry is further based at least in part on ECC error correction.

6. The method of claim 1, wherein generating a tag entry error indication includes sending a tag entry error indication to a processor.

7. The method of claim 6, further comprising sending the address of requested data to at least one of a next level cache and a next level memory.

8. The method of claim 1, wherein disregarding the first data entry based at least in part on detecting the error in the tag entry includes:

in response to the detected error, generating a tag entry error indication; and disregarding the first data entry based at least in part on the tag entry error indication.

9. A method to defer correction of a single-bit error in a tag entry of a cache tag array, the method comprising:
   receiving a micro-operation;
   determining whether to defer correction of the single-bit error based on the micro-operation;
   detecting a single-bit error in a first tag entry;
   sending a tag entry single-bit error signal to a controller;
   correcting the single-bit error in the first tag entry, the correcting including generating a corrected tag entry;
   receiving an error correction signal from the controller, the error correction signal based at least in part on the error signal and the micro-operation;
   generating a hit signal based at least in part on a comparison of the corrected tag entry and a tag field of an address of requested data; and
   selecting the hit signal to be output to a data array based at least in part on the received error correction signal.

10. A method to read data from a cache, the method comprising:
   sending an address of requested data to the cache;
   sending a micro-operation to the cache;
   sending an error correction disable signal to the cache;
   receiving a first data entry from the cache;
   receiving a single-bit tag error signal from the cache; and
   disregarding the first data entry based at least in part on the received single-bit tag error signal and the micro-operation.

11. The method of claim 10, the method further comprising:
   sending an error correction enable signal to the cache; and
   receiving a second data entry from the cache.

12. The method of claim 10, the method further comprising:
   sending an error correction enable signal to the cache;
   receiving a cache miss signal generated at least in part in response to the error correction enable signal; and
   sending the address of requested data to at least one of a next level cache and a next level memory.

13. The method of claim 12, further comprising sending a flush cache directive to the cache.

14. An apparatus to defer correction of a single-bit error in a tag entry of a cache tag array, the apparatus comprising:
   a tag array;
   a comparator, coupled to said tag array, to output a hit signal;
   an error detection circuit, coupled to said tag array, to output an error signal; and
   a control circuit, coupled to the error detection circuit, to generate a forced miss signal based at least in part on the error signal and a micro-operation.

15. An apparatus to defer correction of an error in a tag entry of a cache tag array, the apparatus comprising:
   a tag array;
   a first comparator, coupled to said tag array, to output a first hit signal;
   an error detection circuit, coupled to said tag array, to output an error signal;
   an error correction circuit, coupled to said error detection circuit;
   a second comparator, coupled to said error correction circuit, to output a second hit signal; and
   a multiplexer, coupled to each of said first comparator and said second comparator, to output one of the first hit signal and the second hit signal based at least in part on an error correction signal and a micro-operation.

16. The apparatus of claim 15, wherein:
   said first comparator is to output the first hit signal based at least in part on a first comparison of a first tag entry received from said tag array and a tag field of an address of requested data;
   said error correction circuit is to receive the first tag entry and output a corrected tag entry; and
   said second comparator is to output the second hit signal based at least in part on a second comparison of the corrected tag entry and the tag field of the address of requested data.

17. The apparatus of claim 15, the apparatus further comprising
   a data array coupled to said multiplexer.

18. The apparatus of claim 15, the apparatus further comprising
   a controller, coupled to said error detection circuit and said multiplexer.

19. The apparatus of claim 18, wherein:
   said controller is to receive the error signal; and
   said controller is send the error correction signal to said multiplexer.

20. A system to defer correction of an error in a tag entry of a cache tag array, the system comprising:
   a processor;
   a memory, said memory coupled to said processor; and
   a cache, said cache coupled to said processor, said cache including a tag array,
   a comparator, coupled to said tag array, to output a first hit signal,
   an error detection circuit, coupled to said tag array, to output an error signal, and
   a control circuit, coupled to the error detection circuit, to generate a forced miss signal based at least in part on the error signal and a micro-operation.

21. The system of claim 20, wherein
   said comparator is to output the first hit signal based at least in part on a first comparison of a first tag entry received from said tag array and a tag field of an address of requested data.

22. The system of claim 21, the system further comprising:
   a single-bit error correction circuit to receive the first tag entry and output a corrected tag entry; and
   a second comparator to output a second hit signal based at least in part on a second comparison of the corrected tag entry and the tag field of the address of requested data.

* * * * *